United States Patent
Tsubooka et al.

(10) Patent No.: US 7,995,048 B2
(45) Date of Patent: Aug. 9, 2011

(54) INSTRUMENT PANEL DISPLAY SYSTEM FOR MOUNTING ON AUTOMOBILE, AND IMAGE DATA OUTPUT DEVICE

(75) Inventors: Satoshi Tsubooka, Sakurai (JP); Toshiya Okamoto, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 12/293,881

(22) PCT Filed: Oct. 26, 2006

(86) PCT No.: PCT/JP2006/321386
§ 371 (c)(1),
(2), (4) Date: Sep. 22, 2008

(87) PCT Pub. No.: WO2007/116552
PCT Pub. Date: Oct. 18, 2007

(65) Prior Publication Data
US 2009/0096600 A1  Apr. 16, 2009

(30) Foreign Application Priority Data
Mar. 31, 2006 (JP) .................... 2006-100918

(51) Int. Cl.
*G09G 5/00* (2006.01)

(52) U.S. Cl. ........................... 345/204; 340/461

(58) Field of Classification Search .............. 340/461, 340/462, 691.6, 815.4; 345/87, 204
See application file for complete search history.

(56) References Cited

U.S. PATENT DOCUMENTS

| | | | |
|---|---|---|---|
| 5,231,516 A | 7/1993 | Kamon et al. | |
| 5,305,613 A | 4/1994 | Hotta et al. | |
| 5,519,410 A | 5/1996 | Smalanskas et al. | |
| 5,524,446 A | 6/1996 | Hotta et al. | |
| 5,526,261 A * | 6/1996 | Kallis et al. | 701/51 |
| 5,572,881 A | 11/1996 | Hotta et al. | |
| 5,615,080 A | 3/1997 | Nishitani et al. | |

(Continued)

FOREIGN PATENT DOCUMENTS

CN  1325802 A  12/2001

(Continued)

OTHER PUBLICATIONS

Okamoto et al.: "Simulation Device, Simulation Program, and Simulation Method," U.S. Appl. No. 11/574,145; filed Feb. 23, 2007.

(Continued)

*Primary Examiner* — Thomas J Mullen

(74) *Attorney, Agent, or Firm* — Keating & Bennett, LLP

(57) ABSTRACT

An on-vehicle instrument panel display system preferably is mounted on an automobile and operative such that a plurality of pieces of information including information relating to an automobile are converted into images and the images are displayed all on a liquid crystal panel. The on-vehicle instrument panel display system has a vehicle system, an amenity system, and a safety system, each of which creates data for displaying the images. Further, the on-vehicle instrument panel display system has an instrument panel image composition/output section which combines data created by the systems and outputs the result as composed image data to the liquid crystal panel. The instrument panel image composition/output section includes an image composition LSI. Composed image data outputted from the image composition LSI is an RBG signal or a YUV signal.

9 Claims, 4 Drawing Sheets

U.S. PATENT DOCUMENTS

| | | | |
|---|---|---|---|
| 5,711,675 A | 1/1998 | Nishitani et al. | |
| 5,764,139 A | 6/1998 | Nojima et al. | |
| 5,917,435 A * | 6/1999 | Kamiya et al. | 340/995.26 |
| 6,498,620 B2 * | 12/2002 | Schofield et al. | 348/148 |
| 2001/0019363 A1 | 9/2001 | Katta et al. | |
| 2001/0040505 A1 | 11/2001 | Ishida et al. | |
| 2002/0039136 A1 | 4/2002 | Okamoto et al. | |
| 2002/0050969 A1 | 5/2002 | Ohura | |
| 2003/0053638 A1 | 3/2003 | Yasuhara | |
| 2004/0184612 A1 | 9/2004 | Kohiyama et al. | |
| 2005/0001714 A1 | 1/2005 | Amari | |
| 2005/0102098 A1 | 5/2005 | Montealegre et al. | |
| 2005/0134525 A1 | 6/2005 | Tanghe et al. | |
| 2005/0195273 A1 | 9/2005 | Yamamoto | |

FOREIGN PATENT DOCUMENTS

| | | |
|---|---|---|
| EP | 1 800 959 A1 | 6/2007 |
| JP | 62-58110 A | 3/1987 |
| JP | 4-328420 A | 11/1992 |
| JP | 9-153195 A | 6/1997 |
| JP | 10-075437 A | 3/1998 |
| JP | 10-116086 A | 5/1998 |
| JP | 10-297319 A | 11/1998 |
| JP | 11-281375 A | 10/1999 |
| JP | 11-339195 A | 12/1999 |
| JP | 2000-238552 A | 9/2000 |
| JP | 2001-114027 A | 4/2001 |
| JP | 2001-320616 A | 11/2001 |
| JP | 2001-343929 A | 12/2001 |
| JP | 2002-154393 A | 5/2002 |
| JP | 2003-137007 A | 5/2003 |
| JP | 2003-320911 A | 11/2003 |
| JP | 2004-155395 A | 6/2004 |
| JP | 2004-157434 A | 6/2004 |
| JP | 2004-356962 A | 12/2004 |
| JP | 2005-115107 A | 4/2005 |
| JP | 2005-205997 A | 8/2005 |
| JP | 2006-027613 A | 2/2006 |
| JP | 2006-234505 A | 9/2006 |

OTHER PUBLICATIONS

Okamoto: "Display System, Display System Display Control Method, Data Display Program, and Recording Medium," U.S. Appl. No. 12/296,549; filed Oct. 9, 2008.

Okamoto et al.: "Display System," U.S. Appl. No. 11/574,148; filed Feb. 23, 2007.

Nishida: "Diagnostic Support Device and Diagnostic Support System," U.S. Appl. No. 12/296,550; filed Oct. 9, 2008.

Okamoto: "On-Vehicle Display System and Display Panel Control Device," U.S. Appl. No. 12/305,002; filed Dec. 16, 2008.

Okamoto et al.: "Display System," U.S. Appl. No. 12/406,374, filed Mar. 18, 2009.

Official Communication issued in International Patent Application No. PCT/JP2006/321386, mailed on Nov. 28, 2006.

* cited by examiner

INSTRUMENT PANEL DISPLAY SYSTEM FOR MOUNTING ON AUTOMOBILE, AND IMAGE DATA OUTPUT DEVICE

BACKGROUND OF THE INVENTION

1. Field of the Invention

The present invention relates to an instrument panel display system mounted on an automobile.

2. Description of the Related Art

Generally, an instrument panel of an automobile includes a module case containing: a meter cluster provided with a meter, an indicator lamp, and the like; and a control circuit board for controlling electrical components (such as the meter and the indicator lamp) mounted on the automobile.

For example, Japanese Unexamined Patent Application Publication, Tokukaihei, No. 7-47869 discloses such a technique that a control circuit board and a meter cluster are fixed in a module case so that the meter cluster and the control circuit board are put together and combined into one for the purpose of facilitating maintenance.

Generally, an instrument panel is mounted on a dashboard in an automobile. For example, when the meter cluster and the control circuit board are combined into one as described in Japanese Unexamined Patent Application Publication, Tokukaihei, No. 7-47869, the meter cluster is provided on the interior side and the module case is provided on the engine side (i.e., the backside of the dashboard). Therefore, heat generated in the engine and vibrations caused by running of the automobile are transmitted to the module case. This can give an adverse effect on the control circuit board in the module case.

In addition, because the module case is provided in a narrow space such as the backside of the dashboard, the module case is limited in its shape and thereby the flexibility in designing the meter module is low.

SUMMARY OF THE INVENTION

In order to overcome the problems described above, preferred embodiments of the present invention to provide (i) an on-vehicle instrument panel display system, and (ii) an image data output device, each of which does not require a control circuit board to be provided in a narrow space (such as the backside of a dashboard) and thereby to have a high flexibility in designing.

An on-vehicle instrument panel display system according to a preferred embodiment of the present invention is a system, mounted on an automobile, in which a plurality of pieces of information including information on the automobile is converted into images and the images are displayed all on a display device, the system including: a data generating section that generates data for displaying the images; an image composing section that combines the data generated by the data generating section so as to obtain composite image data, and outputs the composite image data to the display device, the image composing section including an image composition LSI (Large Scale Integration) by which the composite image data is outputted, and the composite image data outputted by the image composition LSI being an RGB (red (R), green (G), and blue (B)) signal or a YUV (luminance (Y), difference between luminance and a red component (U), and difference between luminance and a blue component (V)) signal.

With this arrangement, because the composite image data outputted by the image composing section is the RGB signal or the YUV signal, it is possible to use an RGB cable or a YUV cable having fewer signal lines as a cable to transmit the composite image data from the image composing section to the display device. This allows the image composing section to be separate from the display device.

As a result, the image composing section can be provided so as to be far from the display device mounted on the dashboard. Thereby, the image composing section does not need to be provided in a narrow space such as the backside of the dashboard. On the other hand, when the display device and the image composing section are combined into one module, the image composing section needs to be provided in such a narrow space.

As such, the image composing section can be separated from the display device in the on-vehicle instrument panel display system. This enhances the flexibility in mounting. It is difficult to change the position for mounting the display device because the position is predetermined in most cases. In light of this, this arrangement allows the position for mounting the image composing section to be changed freely. This makes it possible to mount the image composing section in a position which can provide suitable environment for the image composing section.

Because the meter cluster disclosed in Japanese Unexamined Patent Application Publication, Tokukaihei, No. 7-47869 is provided with a speedometer, a fuel gauge, and a warning lamp only, it is not necessary to enhance the performance of the LSI provided on the control circuit board in the module case. Therefore, in Japanese Unexamined Patent Application Publication, Tokukaihei, No. 7-47869, it is not necessary to give special consideration for the effect caused by heat and vibrations. However, an LSI which composes an image has relatively higher performance (operating frequency: about 200 MHz or higher). This causes a problem that such an LSI having higher performance is easily affected by heat or vibrations.

In recent years, a display system such as the following is proposed as a display system for use in an instrument panel of an automobile: a display system which causes a display (i.e., a display section) to display driving support information including an image for navigation (as an additional image) and other information, as well as vehicle condition information including a driving speed, an engine speed, and other information. In such a display system, an image displayed on the display is generated such that (i) various kinds of the driving support information are converted into images and (ii) the images thus obtained are combined by the image composition LSI. In order to carry out this process, an LSI to be used needs to have high performance (i.e., a high-speed operating frequency). The LSI which requires the high-speed operation is easily affected by heat or vibrations in an adverse way.

Therefore, if the image composition LSI is provided on the backside of the dashboard (on the engine side) as described above, the image composition LSI is affected by heat or vibrations and thereby its reliability is decreased. This causes such a problem that the information to be displayed (driving information) cannot be displayed appropriately, thereby decreasing safety.

In view of this, developing a high-performance LSI having high reliability against heat and vibrations is considered as a measure against this problem. This measure, however, brings such a problem that much time and cost are required for developing such an LSI.

On the other hand, the on-vehicle instrument panel display system according to a preferred embodiment of the present invention which has the foregoing arrangement allows an LSI to be provided so as to be far from an engine, which is one of the sources of heat and vibrations. Thereby, even if the LSI is a high-performance one, the LSI can process a signal appropriately. As a result, the information to be displayed (driving information) can be displayed appropriately, and this prevents a decrease in safety.

It is preferable that the image composing section is arranged so as not to be affected by heat or vibrations generated in the engine of the automobile.

With this arrangement, because the image composing section is arranged so as not to be affected by heat or vibrations generated in the engine of the automobile, it is possible to use, as the LSI included in the image composing section, a conventionally used LSI which is easily affected by heat or vibrations. As a result, it is not necessary to specially develop an LSI having heat-resistance and vibration-resistance. This makes it possible to reduce the cost and the time necessary for developing such an LSI.

It is preferable that the image composing section is provided in a position in which heat or vibrations generated in the engine of the automobile are not transmitted to the image composing section at all. However, even if the image composing section is provided in a position where some amount of heat or vibrations is transmitted, some types of LSIs are not affected by that extent of heat or vibrations. Therefore, the position where the image composing section is provided may be any position, as long as a value representing the extent of the effect caused by heat and vibrations is smaller than a predetermined value in the position.

It is preferable that the image composing section is provided in a space, which has a volume of not less than a predetermined value, in the automobile.

Because the display device needs to display a composite image in real-time, the image composition LSI used in the image composing section preferably has about 200 MHz or more of operating frequency (i.e., an operation clock), that is, very high performance. While such a high-performance LSI is operating, the temperature of the high-performance LSI becomes high. Therefore, the high-performance LSI preferably has a heat-radiation device, such as a heat sink, for example.

With this arrangement, however, because the image composing section is provided in the space, having the volume of not less than the predetermined value, in the automobile, it is possible to enhance heat-radiation performance of the image composing section. In this case, the space having the volume of not less than the predetermined value may be any space, as long as the space has a volume which allows an LSI used in the image composing section to ensure a necessary amount of heat radiation without using a heat sink.

Therefore, because an LSI used in the image composing section does not need a heat sink, it is possible to cut the unit cost per heat sink. Also, it is not necessary to ensure the space for attaching a heat sink. This enhances the flexibility in designing the space and the image composing section, thereby making it possible to reduce the size of the image composing section.

It is preferable that the image composing section is arranged so as to be behind a position where a navigation device is attached in the interior of the automobile.

With this arrangement, because the image composing section is arranged so as to be behind the position where the navigation device is attached in the interior of the automobile, it is possible to remove the image composing section merely by removing the navigation device.

This makes it possible to flexibly correspond to a change in hardware architecture such as upgrading of the image composition LSI in the image composing section.

The RGB signal or the YUV signal outputted by the image composition LSI may be a serial RGB signal or a serial YUV signal, respectively.

Normally, a signal becomes more apt to be affected by external noises as a signal line becomes longer. This feature is clearly observed in an analog signal.

In view of this, in the foregoing arrangement, the RGB signal or the YUV signal outputted by the image composition LSI is the serial RGB signal or the serial YUV signal, respectively. This makes it possible to output composite image data to the display device while the data is not affected by external noises.

An image data output device according to a preferred embodiment of the present invention is a device that converts, into image data, a plurality of pieces of information including information on an automobile and outputs the image data to a display device mounted on the automobile, the image data output device, including: an image composing section that combines the image data to be outputted to the display device, the image composing section including an image composition LSI by which the composite image data is outputted, and the composite image data outputted by the composite image LSI being an RGB signal or a YUV signal.

With this arrangement, because the composite image data outputted by the image composing section is the RGB signal or the YUV signal, it is possible to use an RGB cable or a YUV cable as a cable for transmitting the composite image data from the image composing section to the display device. This allows the image composing section to be positioned so as to be separated from the display device.

As a result, the image composing section can be provided so as to be far from the display device provided on the dashboard. Thereby, the image composing section does not need to be provided in a narrow space such as the backside of a dashboard, although the image composing section needs to be provided in such a narrow space when the display device and the image composing section are combined into one module.

As such, the image composing section can be separated from the display device in the on-vehicle instrument panel display system. This enhances the flexibility in mounting. It is difficult to change the position for mounting the display device because the position is predetermined in most cases. In light of this, this arrangement allows the position for mounting the image composing section to be changed freely. This makes it possible to mount the image composing section in a position which can provide suitable environment for the image composing section.

As described above, the on-vehicle instrument panel display system according to a preferred embodiment of the present invention is a system, mounted on an automobile, in which a plurality of pieces of information including information on the automobile is converted into images and the images are displayed in all on a display device, the system including: a data generating section arranged to generate data for displaying the images; and an image composing section arranged to combine the data generated by the data generating section so as to obtain composite image data, and output the composite image data to the display device, the image composing section including an image composition LSI by which the composite image data is outputted, and the composite image data outputted by the image composition LSI being an RGB signal or a YUV signal. This allows the image composing section to be separated from the display device, thereby enhancing the flexibility in mounting.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention are described below.

Figure 1:
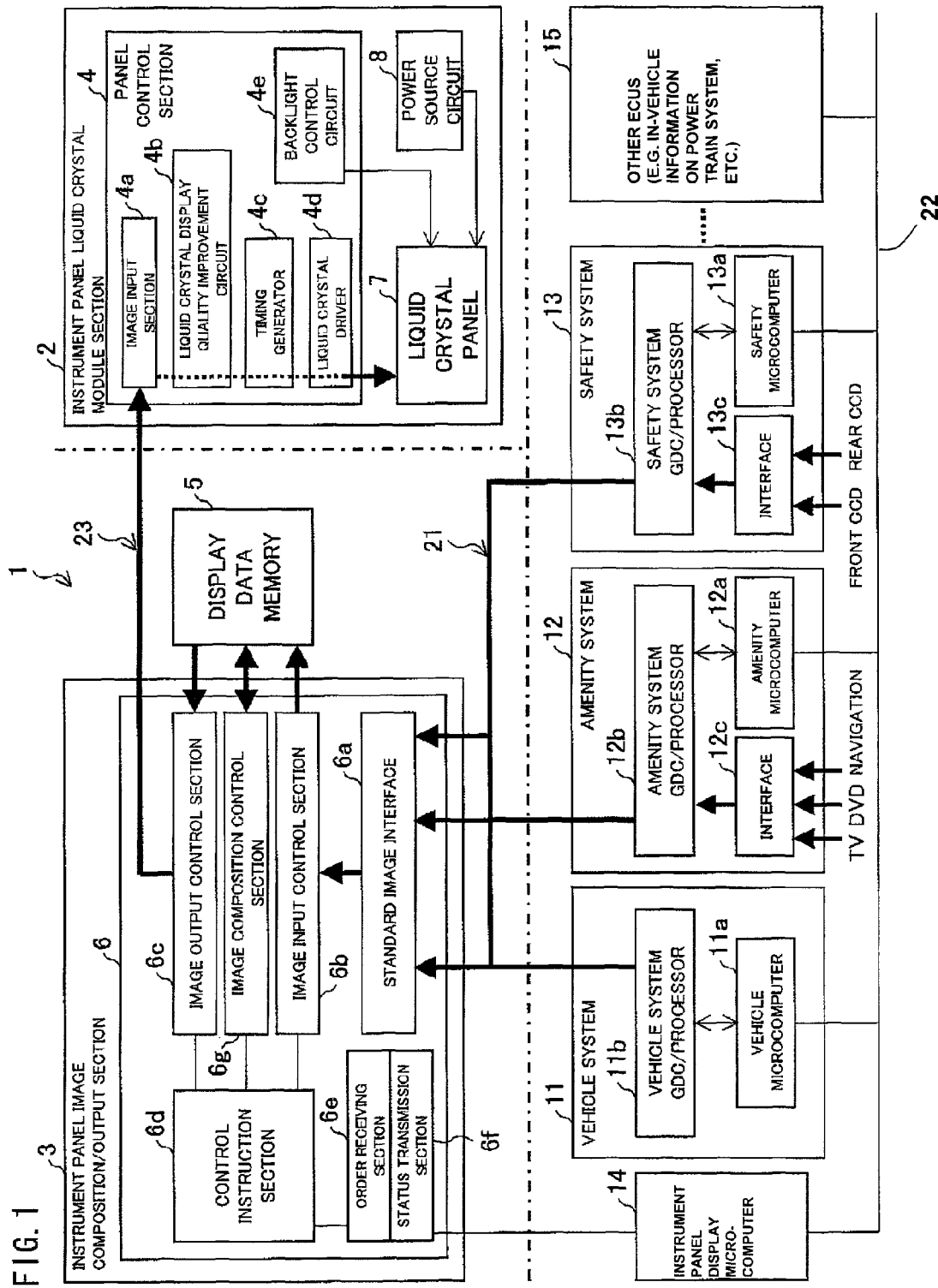
FIG. 1 illustrates a preferred embodiment of the present invention, and is a block diagram illustrating the main elements of an instrument panel display system.

FIG. 1 is a block diagram illustrating an instrument panel control system for an automobile in which an instrument panel display system (i.e., an on-vehicle instrument panel display system) 1 according to a preferred embodiment of the present embodiment is mounted.

As illustrated in FIG. 1, the instrument panel control system preferably includes: an instrument panel liquid crystal module section 2, which is contained in the instrument panel display system 1; and an instrument panel image composition/output section (i.e., an image data output device) 3, which is also contained in the instrument panel display system 1 and outputs an image signal to the instrument panel liquid crystal module section 2. Also, the instrument panel control system includes a vehicle system 11, an amenity system 12, a safety system 13, and an instrument panel display microcomputer 14, each of which outputs various kinds of signals to the instrument panel image composition/output section 3. Further, the instrument panel control system includes other ECUs 15, which output a control signal to various kinds of systems and microcomputers.

The instrument panel liquid crystal module section 2 includes: a panel control section 4; a liquid crystal panel 7, which is controlled by the panel control section 4; and a power source circuit 8, which supplies power source to the liquid crystal panel 7.

The panel control section 4 includes: an image input section 4a, which receives an image signal outputted from the instrument panel image composition/output section 3; a liquid crystal display quality improvement circuit 4b, which improves image quality of the image signal the image input section 4a receives; a timing generator 4c, which generates a signal for determining the timing of outputting the image signal having an improved image quality to the liquid crystal panel 7; and a liquid crystal driver 4d, which outputs, to the liquid crystal panel 7, a drive signal for driving the liquid crystal panel 7 in accordance with the image signal outputted according to the signal generated by the timing generator 4c. Also, the panel control section 4 includes a backlight control circuit 4e, which controls a backlight of the liquid crystal panel 7.

Figure 2:
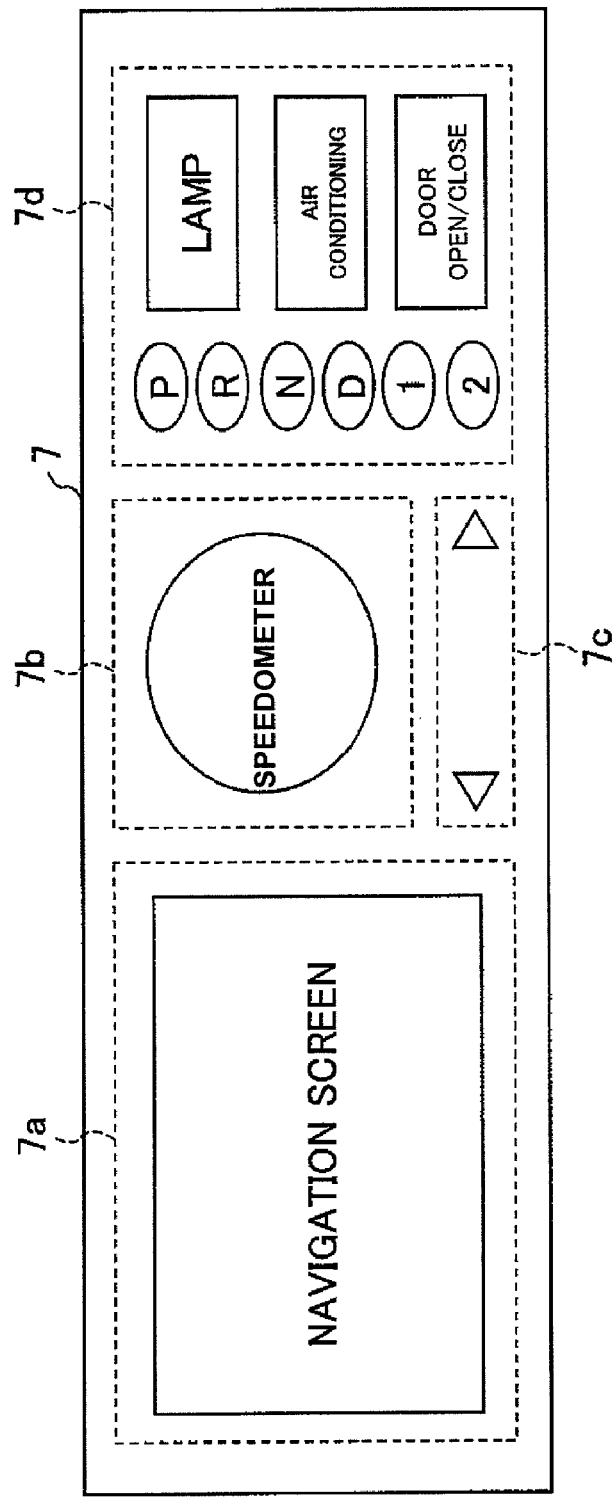
FIG. 2 is a view illustrating one of the display examples of a display device of the instrument panel display system illustrated in FIG. 1.

The liquid crystal panel 7 includes, for example, as illustrated in FIG. 2, four display regions (7a to 7d). A first display region 7a displays an image for navigation; a second display region 7b displays a speedometer; a third display region 7c displays arrows of turn signal lamps; and a fourth display region 7d displays various kinds of lamps such as a lamp indicating shift lever positions.

Images displayed on the display regions on the liquid crystal panel 7 are generated in accordance with a signal outputted from the instrument panel image composition/output section 3.

The instrument panel image composition/output section 3 includes an image composition LSI 6 (i.e., an image composing section) arranged to generate, in accordance with various kinds of vehicle information, a composite image to be displayed on the liquid crystal panel 7.

The image composition LSI 6 includes: a standard image interface 6a as an interface which inputs image information; an image input control section 6b arranged to output the image information obtained by the standard image interface 6a to a display data memory 5, which is an external memory; an image composition control section 6g arranged to (i) read out the image information stored in the display data memory 5 as required, (ii) compose the image, and (iii) write the image thus composed into the display data memory 5; an image output control section 6c arranged to (i) read out the image information stored in the display data memory 5 as required and (ii) output, to the instrument panel liquid crystal module section 2, the image information thus read out; and a control instruction section 6d arranged to control the image input control section 6b, the image composition control section 6g, and the image output control section 6c. Also, the image composition LSI 6 includes an order receiving section 6e and a status transmission section 6f, each of which outputs a control signal to the control instruction section 6d.

Image information is inputted, to the standard image interface 6a via an image information LAN cable 21, from the vehicle system 11, the amenity system 12, and the safety system 13.

The vehicle system 11 is an input/output system used in a vehicle, specifically for a speedometer, a tachometer, and the like. The vehicle system 11 includes a vehicle microcomputer 11a and a vehicle system GDC (Graphic Display Controller)/processor 11b. The vehicle system 11 outputs image information regarding a vehicle, the image information being generated by the vehicle system GDC/processor 11b.

The amenity system 12 is an input/output system used for amenities such as a DVD, a TV, a GPS, and an audio. The amenity system 12 includes an amenity microcomputer 12a and an amenity system GDC/processor 12b. The amenity system GDC/processor 12b outputs image information regarding an amenity, the image information being generated in accordance with a TV image, a DVD image, or an image for navigation. These images are inputted via an interface 12c.

The safety system 13 is an input/output system used for safety, specifically for various types of CCDs and sensors, and the like. The safety system 13 includes a safety microcomputer 13a and a safety system GDC/processor 13b. The safety system GDC/processor 13b outputs image information regarding safety, the image information being generated in accordance with (i) an image captured by a CCD camera provided in the front of a vehicle and (ii) an image captured by a CCD camera provided in the rear of the vehicle. These images are inputted via an interface 13c.

To the order receiving section 6e and the status transmission section 6f, each of which is included in the image composition LSI 6, a control signal is inputted from the other ECUs 15 via an instrument panel display microcomputer 14.

The other ECUs 15 output a signal such as in-vehicle information on a power train system, etc., via a control signal LAN cable 22, to the following microcomputers: the vehicle microcomputer 11*a* included in the vehicle system 11; the amenity microcomputer 12*a* included in the amenity system 12; the safety microcomputer 13*a* included in the safety system 13; and the instrument panel display Microcomputer 14.

The image output control section 6*c* included in the image composition LSI 6 outputs a composite image as an RGB signal or a YUV signal. The composite image is generated such that the image composition control section 6*g* appropriately combines display data (i.e., image information) read out from the display data memory 5. That is, an RGB signal or a YUV signal generated by the image output control section 6*c* is outputted to the instrument panel liquid crystal module section 2 via an RGB or YUV cable 23.

An RGB signal is a signal for representing a color by the combination of three colors: red (R), green (G), and blue (B). The RGB signal is one of the signals used for representing a color on a computer.

A YUV signal is a signal for representing a color by using three kinds of information: a luminance signal (Y); a difference between a luminance signal and a red component (U); and a difference between a luminance signal and a blue component (V). Human's eyes are sensitive to a change in brightness more than to a change in colors. The YUV signal makes use of this nature and allocates a larger amount of data to luminance information. Thereby, the YUV signal has such an advantage that the YUV signal can obtain a high compression rate and less deterioration in an image quality. For this reason, the YUV signal is preferably used in a compression technology such as for TV, JPEG, and MPEG.

The RGB signal may be used as it is for displaying an image on a display of a computer. The YUV signal, however, should be converted into an RGB signal for this purpose.

Figure 4:
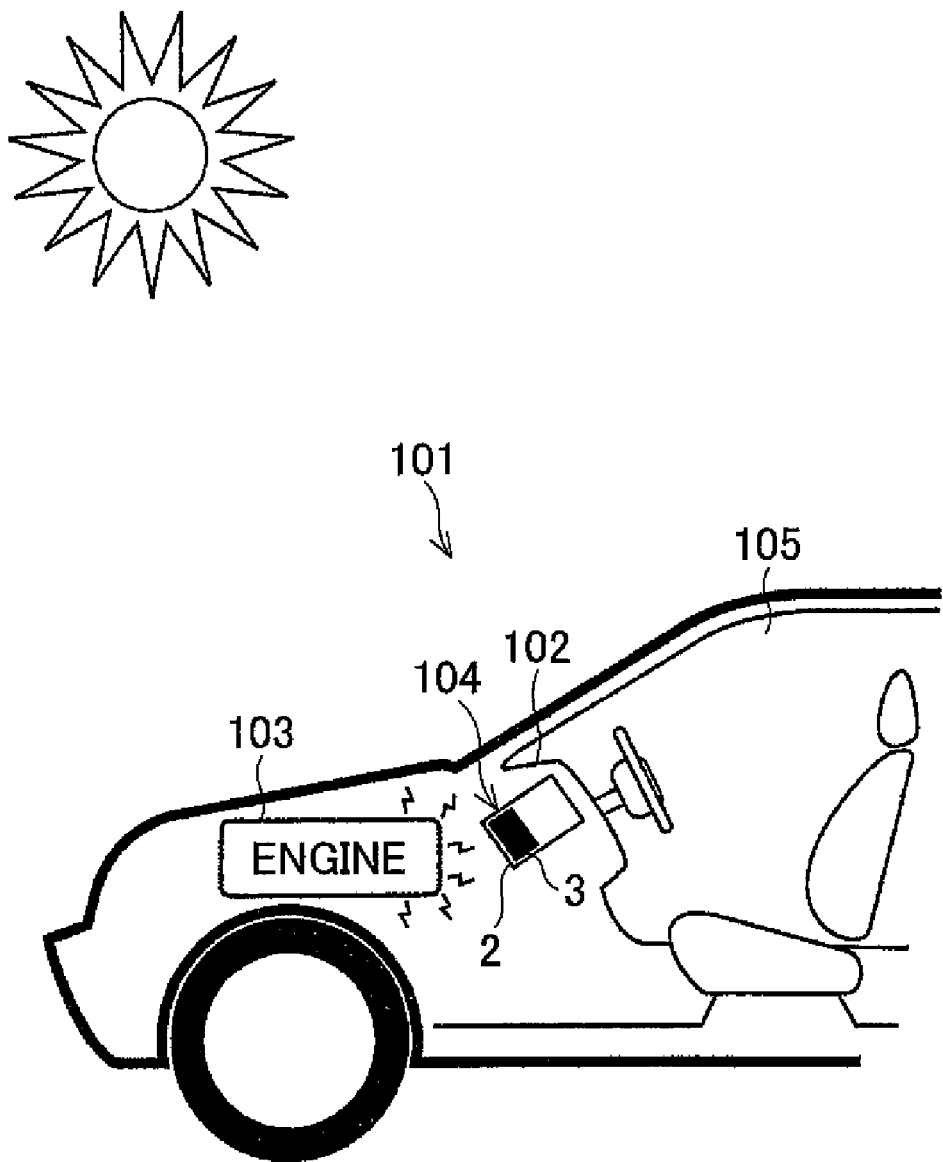
FIG. 4 is a view illustrating one of the examples for the purpose of comparison with the instrument panel display system mounted on the automobile illustrated in FIG. 3.

The instrument panel display system 1 having the foregoing arrangement is generally mounted in such a manner that, as illustrated in FIG. 4, the instrument panel liquid crystal module section 2 and the instrument panel image composition/output section 3 are provided in a module mounting space 104 created between the backside of a dashboard 102 of a vehicle 101 and an engine 103 of the vehicle 101. In the instrument panel liquid crystal module section 2, the liquid crystal panel 7 needs to be mounted on the interior 105 side of the vehicle 101. Therefore, it is necessary to mount the instrument panel image composition/output section 3 on the engine 103 side.

The image composition LSI 6 needs to be a high-performance LSI having an operating frequency of 200 MHz or higher so as to combine a plurality of images and thereby to obtain a composite image. Therefore, the image composition LSI 6 is easily affected by heat or vibrations. For this reason, when the image composition LSI 6 is mounted on the engine 103 side as illustrated in FIG. 4, heat and vibrations generated in the engine 103 are transmitted to the image composition LSI 6. This causes such a problem that an image is not composed appropriately.

In view of this, developing an image composite LSI 6 which is less affected by heat or vibrations is considered as a measure against this problem. This measure, however, is not a practical solution because this measure needs much time and cost for developing such an LSI.

In the instrument panel display system 1 having the foregoing arrangement, a cable connecting the instrument panel liquid crystal module section 2 and the instrument panel image composition/output section 3 is an RGB or YUV cable 23 each of which has fewer signal lines because the output from the instrument panel image composition/output section 3 is an RGB signal or a YUV signal. This allows the instrument panel image composition/output section 3 to be separated from the instrument panel liquid crystal module section 2 so that the instrument panel image composition/output section 3 can avoid heat and vibrations generated in the engine 103.

Figure 3:
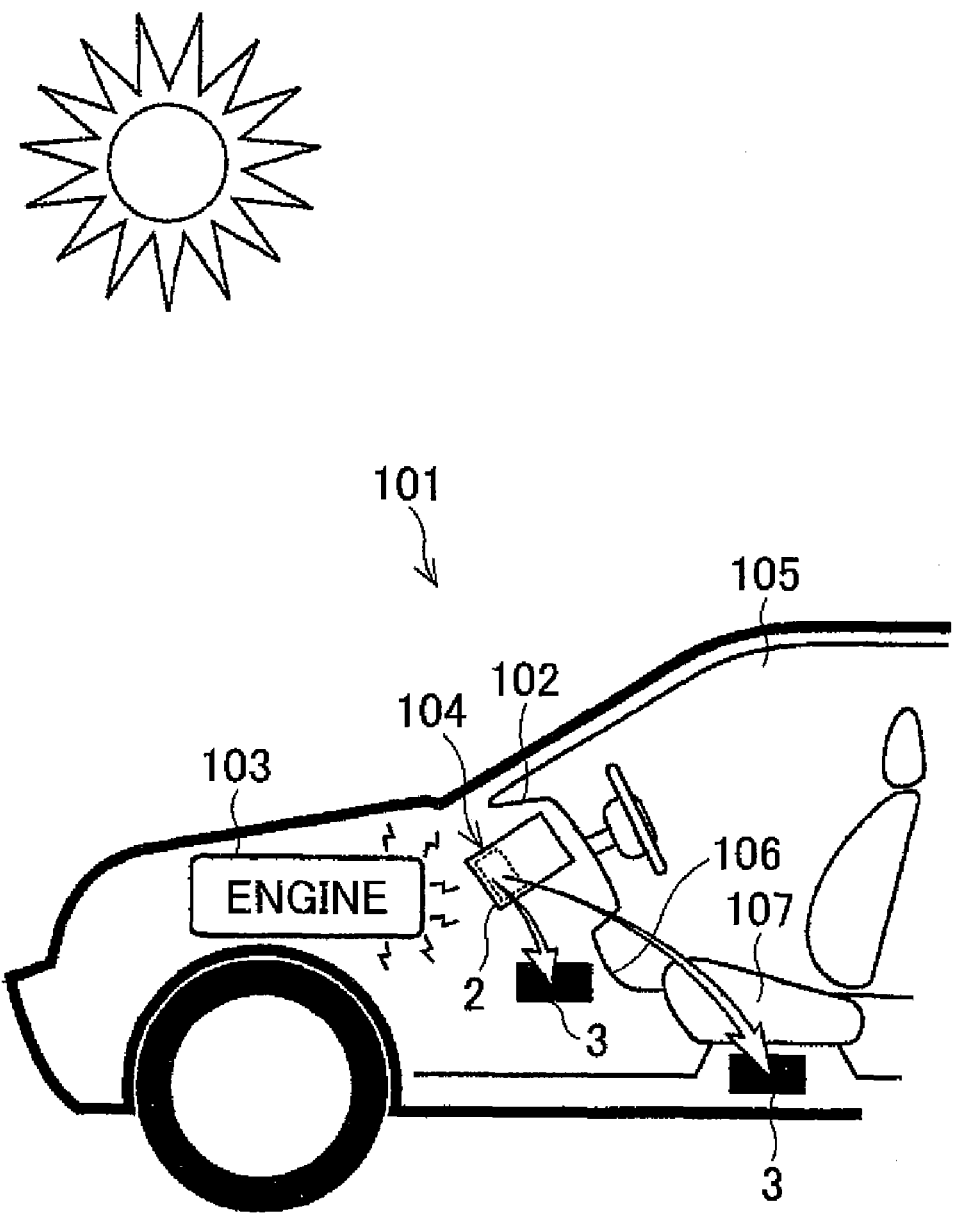
FIG. 3 is a view illustrating one of the examples of the instrument panel display system according to a preferred embodiment of the present invention mounted on an automobile.

As illustrated in FIG. 3, examples of the position in which the instrument panel image composition/output section 3 can avoid heat and vibrations generated in the engine 103 may encompass: a position below a navigation system attachment section 106 on the interior 105 side; and a position below a seat 107 on the interior side. Positioning the instrument panel image composition/output section 3 in either of these positions prevents the instrument panel image composition/output section 3 from being affected, in an adverse way, by heat or vibrations generated in the engine 103. This makes it possible to compose an image appropriately.

Thereby, a conventional image composition LSI 6 may be used, and it is not necessary to develop a new LSI.

That is, when the instrument panel display system 1 having the foregoing arrangement is used as an on-vehicle instrument panel display system, the instrument panel image composition/output section 3 including the image composition LSI 6 (image composing section) can be separated from the instrument panel liquid crystal module section 2 (display device). This enhances the flexibility in mounting. It is difficult to change the position for mounting the instrument panel liquid crystal module section 2 because the position is predetermined in an automobile in most cases. In light of this, this arrangement allows the position for mounting the instrument panel image composition/output section 3 to be changed freely. This makes it possible to mount the instrument panel image composition/output section 3 in a position which can provide suitable environment for the instrument panel image composition/output section 3.

Therefore, the instrument panel display system 1 allows the instrument panel image composition/output section 3 to be provided so as to be far from the engine, which is one of the sources of heat and vibrations. Thereby, even if an LSI is a high-performance one, the LSI can process a signal appropriately. As a result, the information to be displayed (driving information) can be displayed appropriately, and this prevents a decrease in safety.

In addition, as illustrated in FIG. 3, the instrument panel image composition/output section 3 is positioned so as not to be affected by heat or vibrations generated in an engine 103 in a vehicle 101.

As such, because the instrument panel image composition/output section 3 is provided so as not to be affected by heat or vibrations generated in the engine in the vehicle 101, it is possible to use a conventionally used LSI which is easily affected by heat and vibrations as the image composition LSI 6 included in the instrument panel image composition/output section 3. As a result, it is not necessary to specially develop an LSI having heat-resistance and vibration-resistance. This makes it possible to reduce the cost and the time necessary for developing such an LSI.

It is preferable that the instrument panel image composition/output section 3 is provided in a position in which heat or vibrations generated in the engine 103 are not transmitted at all. However, even if the instrument panel image composition/output section 3 is provided in a position where some extent of heat or vibrations are transmitted, some types of LSIs are not affected by that extent of heat or vibrations. Therefore, the position where the instrument panel image composition/output section 3 is provided may be any position, as long as a value representing the extent of the effect caused by heat and vibrations is smaller than a predetermined value in the position.

Also, the instrument panel image composition/output section 3 may be provided in a space, having a volume of not less than a predetermined value, in the vehicle 101. Providing the instrument panel image composition/output section 3 in the space, having the volume of not less than the predetermined value, in the vehicle 101 makes it possible to enhance heat-radiation performance of the instrument panel image composition/output section 3. The space having the volume of not less than the predetermined value may be any space, as long as the space has a volume which allows an LSI used in the image composing section to ensure a necessary amount of heat radiation without using a heat sink.

Therefore, because the LSI used in the instrument panel image composition/output section 3 does not need a heat sink, it is possible to cut the unit cost per heat sink. Also, it is not necessary to ensure the space for attaching a heat sink. This enhances the flexibility in designing the space and the instrument panel image composition/output section 3, thereby making it possible to reduce the size of an image composing section.

As described above, it is preferable that the instrument panel image composition/output section 3 is provided, as illustrated in FIG. 3, so as to be arranged in an automobile such that the image composing section is positioned closer to the rear of the vehicle than a navigation device which is provided in an interior of the automobile.

With this arrangement, because the instrument panel image composition/output section 3 is provided so as to be behind the position where the navigation device is attached in the interior of the automobile 101, it is possible to remove the instrument panel image composition/output section 3 merely by removing the navigation device. This makes it possible to flexibly correspond to a change in hardware architecture such as upgrading of the image composition LSI 6 in the instrument panel image composition/output section 3.

An RGB signal or a YUV signal outputted by the image composition LSI 6 may be a serial signal, a digital signal, or an analog signal. Of these signals, the serial signal is preferable because the serial signal is less apt to be affected by noises.

In a case where the serial signal is used, an interface arranged to connect the instrument panel liquid crystal module section 2 and the instrument panel image composition/output section 3 may be: an LVDS interface, which is an I/O standard for high-speed communication; an interface such as DVI, which is a digital connection standard for a general-purpose display interface; or the like.

Normally, a signal is more apt to be affected by external noises as a signal line becomes longer. This feature is clearly observed in an analog signal.

In view of this, it is preferable that an RGB signal or a YUV signal outputted by the image composition LSI 6 is a serial RGB signal or a serial YUV signal, respectively. This makes it possible to output composite image data to the liquid crystal panel 7 (i.e., a display device) while the data is not affected by external noises.

As described above, the instrument panel display system 1 having this arrangement makes it possible to display necessary information as a composite image in real-time and appropriately, while the system is not affected by heat or vibrations generated in the engine 103 of the vehicle 101. This enhances driving safety of an automobile.

The present invention being thus described, it will be obvious that the same way may be varied in many ways. Such variations are not to be regarded as a departure from the spirit and scope of the present invention, and all such modifications as would be obvious to one skilled in the art are intended to be included within the scope of the following claims.

The present invention is preferably used in an instrument panel display system for an automobile, the instrument panel display system being provided with an image composing section which uses an LSI carrying out high-speed clock operation.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An on-vehicle instrument panel display system, mounted on an automobile, in which images including information relating to the automobile are displayed all on a display device, said system comprising:
   a data generating section arranged to generate data for displaying the images; and
   an image composing section arranged to combine the data generated by the data generating section so as to obtain composite image data, and output the composite image data to the display device; wherein
   the image composing section includes an image composition LSI (Large Scale Integration) by which the composite image data is outputted; and
   the composite image data outputted by the image composition LSI is an RGB (red (R), green (G), and blue (B)) signal or a YUV (luminance (Y), difference between luminance and a red component (U), and difference between luminance and a blue component (V)) signal.

2. The on-vehicle instrument panel display system as set forth in claim 1, wherein the image composing section is arranged so as not to be affected by heat or vibrations generated in an engine of the automobile.

3. The on-vehicle instrument panel display system as set forth in claim 2, wherein the RGB signal or the YUV signal outputted by the image composition LSI is a serial RGB signal or a serial YUV signal, respectively.

4. The on-vehicle instrument panel display system as set forth in claim 1, wherein the image composing section is provided in a space, having a volume of not less than a predetermined volume, in the automobile.

5. The on-vehicle instrument panel display system as set forth in claim 4, wherein the RGB signal or the YUV signal outputted by the image composition LSI is a serial RGB signal or a serial YUV signal, respectively.

6. The on-vehicle instrument panel display system as set forth in claim 1, wherein the image composing section is arranged in the automobile such that the image composing section is positioned further from a front of the automobile than a navigation device which is provided in an interior of the automobile.

7. The on-vehicle instrument panel display system as set forth in claim 6, wherein the RGB signal or the YUV signal outputted by the image composition LSI is a serial RGB signal or a serial YUV signal, respectively.

8. The on-vehicle instrument panel display system as set forth in claim 1, wherein the RGB signal or the YUV signal outputted by the image composition LSI is a serial RGB signal or a serial YUV signal, respectively.

9. An image data output device that converts, into image data, a plurality of pieces of information including information relating to an automobile and outputs the image data to a display device mounted on the automobile, said image data output device comprising:

an image composing section arranged to combine the image data to be outputted to the display device;

the image composing section including an image composition LSI (Large Scale Integration) by which the combined image data is outputted; and the composite image data outputted by the image composition LSI being an RGB (red (R), green (G), and blue (B)) signal or a YUV (luminance (Y), difference between luminance and a red component (U), and difference between luminance and a blue component (V)) signal.

* * * * *